United States Patent Office 3,498,957
Patented Mar. 3, 1970

3,498,957
POLYMERIZATION OF CYCLIC CARBOXYLIC ESTERS IN THE PRESENSE OF A NONPOLYMERIZABLE ESTER PLASTICIZER
Henning W. Jacobson, Wilmington, Del., assignor, by mesne assignments, to Ethicon, Inc., a corporation of New Jersey
No Drawing. Filed Sept. 14, 1965, Ser. No. 487,295
Int. Cl. C08g 17/017
U.S. Cl. 260—78.3      10 Claims

ABSTRACT OF THE DISCLOSURE

Cyclic carboxylic esters are polymerized under anhydrous conditions in an inert atmosphere in the presence of a catalyst and a nonpolymerizable ester having a boiling point above the melting point of the polymer produced. The polymers so prepared may be spun at a lower temperature to give improved filaments of superior tensile strength.

---

This invention relates to processes for preparing polymers and fibers. More particularly, it concerns processes for preparing high molecular weight, melt-spinnable polymers derived from inter- and intramolecular cyclic esters.

Polymers and copolymers of inter- and intra-molecular cyclic esters have been found useful as fibers, e.g., as absorbable sutures in joining or supporting living tissue, especially in filament form. However, it is frequently difficult to obtain high-quality, low denier filaments of such polymers and copolymers by melt-spinning procedures because of the marginal stability of some of the polymers and copolymers at spinning temperatures. The degradation of the polymers at these temperatures results in fragile, uneven, low tensile strength filaments. These characteristics also result in backwinding problems, e.g., breaking or uneven distribution.

It is therefore an object of this invention to provide an improvement in the preparation of polymers and copolymers of inter- and intramolecular cyclic carboxylic esters which comprises carrying out the polymerization of said esters in the presence of a nonpolymerizable ester having a boiling point above the melting point of the polymer produced. This and other objects will become apparent hereinafter.

Surprisingly, the presence of the nonpolymerizable ester does not prevent or prematurely terminate the formation of high molecular weight polymers and copolymers of the cyclic esters. Also surprisingly, the polymers prepared by adding the nonpolymerizable ester before polymerization, as compared to those in which the nonpolymerizable ester was added to the preformed polymer, could be melt-spun at lower temperatures and resulted in filaments that were more uniform and of higher tensile strength.

The techniques for converting cyclic carboxylic esters to essentially linear polyesters are well known to those skilled in the art. They are described, for example, in U.S. Patents 2,703,316 and 2,758,987 and Belgian Patent 654,236. They are also discussed in Houben-Weyl, "Methode der Organischen Chemie," 4th ed., vol. 14, Part 2, p. 8, and in reference cited therein. They are further discussed in assignee's copending application S.N. 322,494, filed Nov. 8, 1963, in the name of Roger A. Fouty.

As discussed in the aforementioned references, polymerization is generally effected by heating the purified polymerizable cyclic ester or esters above the melting point of the mixture in the presence of a catalyst, under anhydrous conditions in an inert atmosphere. Thus the polymerizable cyclic ester monomers, the reaction temperatures, times, and catalysts for the polymerization are generally well-known.

However, to briefly describe the process, the polymerizable cyclic esters (intermolecular cyclic esters and lactones) employed as monomers can be any such ester which, on polymerization, produces the repeating unit

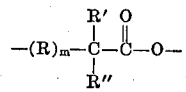

wherein R is lower alkylene, preferably methylene (—CH$_2$—) or ethylene (—CH$_2$CH$_2$—), m is 0 or 1, R' is hydrogen or lower alkyl, R" is hydrogen or alkyl of up to about 22 carbons when m is 0, and R" is hydrogen or lower alkyl when m is 1.

Preferred monomers, because of availability, are the intermolecular cyclic esters of α-hydroxycarboxylic acids, i.e., those esters which produce repeating unit polymers in which m is zero. More preferred, because of superior properties of the polymers thereof, are lactide monomers, i.e., which produce repeating units where m is zero, R' is hydrogen and R" is methyl, especially L-lactide.

Illustrative of the monomers which can be employed in the process of this invention are lactide (D-, L-, and DL-), glycolide, β-propiolactone, tetramethylglycolide, β-butyrolactone, ν-butyrolactone, pivalolactone, and intermolecular cyclic esters of α-hydroxybutyric acid, α-hydroxyisobutyric acid, α-hydroxyvaleric acid, α-hydroxyisovaleric acid, α-hydroxycaproic acid, α-hydroxy-α-ethylbutyric acid, α-hydroxyisocaproic acid, α-hydroxy-β-methylvaleric acid, α-hydroxyheptanoic acid, α-hydroxyoctanoic acid, α-hydroxydecanoic acid, α-hydroxymyristic acid, α-hydroxystearic acid, α-hydroxylignoceric acid, and the like.

A variety of catalysts can be used in such polymerization reactions. Operable types include Lewis acids, oxides of polyvalent metal, salts of polyvalent metal, salts of polyvalent metals convertible to polyvalent metal oxides under polymerization conditions, organometallic compounds of Group II and Group IV metals, and organometallic salts of such metals. The catalyst or type of catalyst to be used is dictated to some extent by the cyclic carboxylic ester to be polymerized.

Examples of operable catalysts are boron trifluoride, antimony trifluoride, ferric chloride, stannic chloride, antimony trioxide, dibutyltin dilaurate, lithage, lead stearate, basic lead carbonate, zinc oxide, zinc borate, cadmium oxide, titanyl stearate, magnesium oxide, calcium formate, dibutylzinc, ethylisobutylzinc, diphenylzinc, di-o-tolylzinc, di-β-naphthylzinc, and diethylcadmium.

A preferred group of catalysts, especially for the polymerization of intermolecular cyclic esters of α-hydroxy acids, are oxides, salts convertible to oxides under polymerization conditions, and dialkyl and diaryl derivatives of Group II metals of atomic number 12 through 56.

Most preferred, because of the rapid but controllable polymerizations which they bring about, are dialkyl and diaryl zinc compounds of the formula R—Zn—R', where R and R' are the same or different, preferably the same, and are alkyl or aryl of up to about 10 carbons.

The amount and type of catalyst used determine the particular temperature and time required to produce the polymer. Thus, the amount can be as low as 0.01 weight percent or as high as 2 weight percent. As a rule, the lower the amount of catalyst, the longer the time required to produce polymer of a given inherent viscosity and, conversely, the higher the catalyst concentration, the shorter the time. In addition, the catalyst concentration inversely affects the molecular weight, especially with hydrocarbylmetal catalysts such as diethylzinc. Balance is usually obtained employing from 0.02 weight percent to 1 weight percent of catalyst.

The novel aspect of this process is the addition of the nonpolymerizable ester to the reaction mixture before polymerization is initiated. The nonpolymerizable ester must have a boiling point above the melting point of the polymer produced in the reaction and is derived from an aliphatically saturated hydrocarbon carboxylic acid and an aliphatically saturated hydrocarbon alcohol that can contain ether oxygen linkages. "Aliphatically saturated hydrocarbon" is defined as a hydrocarbon group that is free of ethylenic or acetylenic unsaturation, i.e., the only unsaturation that can be present is aromatic. Preferably, the nonpolymerizable ester will have a boiling point above about 210° C.

More specifically, the nonpolymerizable ester is defined as an ester that contains no free carboxyl or hydroxyl groups and is derived from a carboxylic acid of up to 18 carbon atoms of the formula $Q(COOH)_m$ where Q is an aliphatically saturated hydrocarbon group of valence $m$, and $m$ is a cardinal number of 1–3, i.e., 1, 2 or 3, and a hydroxyl compound of up to 18 carbon atoms of the formula $Q'(OH)_n$ wherein $Q'$ is an aliphatically saturated hydrocarbon group, mono-oxahydrocarbon group, or dioxahydrocarbon group of valence $n$ and $n$ is a cardinal number of 1–4, i.e., 1, 2, 3 or 4; with the proviso that $m$ is 1 when $n$ is 2–4 and $n$ is 1 when $m$ is 2–3.

In addition, the nonpolymerizable ester may be derived in part from a hydroxycarboxylic acid whose hydroxyl and carboxyl groups are esterified by the acids and alcohols of the types just described. Further, the dihydric aliphatic alcohols can include polyethylene glycols of the formula $HO(CH_2CH_2O)_zH$ where $z$ is from 2 to about 130, preferably 2–10 and most preferably 2 or 3. The preferred nonpolymerizable esters are those described in the previous paragraph.

Illustrative of the nonpolymerizable esters are amyl stearate, dicapryl phthalate, bis(2-ethylhexyl)hexahydrophthalate, ethyl phthalyl ethyl glycolate, acetyl triethyl citrate, ethylene glycol dipropionate, triacetin, phenyl benzoate, dicyclohexyl adipate, bis(ethoxyethyl) phthalate, glyceryl tributyrate (tributyrin), bis(methylcyclohexyl) phthalate, benzyl butyl phthalate, dihexyl sebacate, triethylene glycol di-2-ethylhexanoate, butoxyethyl laurate, tetrahydrofurfuryl oleate, pentaerythritol tetraacetate, propylene glycol distearate, polyethylene glycol divalerate, trioctyl trimellitate, and the like. These esters are described, in general, in Buttrey, Plasticizers, 2nd edition, Cleaver Hume Press Ltd., London (1956).

The amount of the nonpolymerizable ester employed in the process can vary from 2 to 50% of the weight of the polymerizable monomer or monomers, and preferably varies from 5 to 20% by such weight. For ease of removal of the nonpolymerizable ester from the resulting polymer, it is preferred that the nonpolymerizable ester be appreciably water soluble and for this reason, triacetin is preferred. For ease of handling, it is preferred that they be liquid at room temperature.

In general, it is desirable to agitate the reaction mixture continuously during the polymerization in order to produce a homogeneous polymer at good conversions. In some instances it may be desirable to conduct the reaction in two steps, the first being carried out at a lower temperature than the second, or finishing step.

As previously stated, homo- and copolymers can be prepared by this novel process. Preferably, because of superior properties of the polymer, one comonomer will be lactide, particularly L-lactide, in an amount constituting at least 85% by weight of the total monomer weight. It is preferred to use highly purified lactides and lactones. For example, for excellent results L-lactide should have a melting point of at least 96° C. and a specific rotation greater than —295°. When the polymer prepared by the process of this invention is poly-L-lactide, or at least 85% poly-L-lactide, the process is preferably carried out at a temperature between about 90–120° C., and most preferably between about 100°–115° C.

The following is a brief description of a specific method for preparing plasticized polyesters by the process of this invention. Lactide, purified by several crystallizations from carbon tetrachloride, is placed either alone in the case of homopolymerization, or with one or more solid comonomers in the case of copolymerization, along with a nonpolymerizable ester, in a throughly dried reactor equipped with a magnetic stirring bar and an inlet tube for evacuation and for introduction of materials. Air is completely removed by alternately evacuating and admitting nitrogen to atmospheric pressure. The lactide is melted under reduced pressure, and nitrogen is returned to atomspheric pressure. The reactor is heated in a bath at about 105° C. with stirring and the cataylst is added. In the case of copolymerization with a liquid comonomer the liquid comonomer is preferably added after the lactide has mented. Heating is continued until polymer having the desired inherent viscosity is obtained. The required time may be from a few minutes up to 25 or more hours, depending upon the catalyst used. The resulting polymer, which contains the nonpolymerizable ester is then melt-spun by conventional procedures to obtain filaments which may have diameters as small as 0.1 mil or less for the individual strands making up miltifilament structures and as large as 45 mils for very heavy monofilament sutures.

After spinning, the nonpolymerizable ester is conveniently removed by immersing the filaments in a liquid that dissolves the plasticizer but does not affect the polymer. Water, ethyl alcohol and hexane are examples of such solvents. This can be done by quenching in said solvent immediately after spinning. The filaments so obtained may be drawn to effect orientation and to improve tensile strength. This is accomplished by drawing (permanently elongating) the filaments at a temperature between 70° C. and 140° C., preferably between 90° C. and 135° C., the preferred draw ratio being from 2:1 to 11:1. The drawing step may be conducted in one or more steps, in air or in a bath containing a liquid nonsolvent for the polymer, e.g., glycerol or water. This drawing brings about a marked increase in tensile strength and molecular orientation, as measured by the X-ray orientation angle.

The invention is further illustrated by the following examples in which "parts" are parts by weight.

EXAMPLE I

In a round-bottom flask with a side arm for evacuation and addition of catalyst was placed 47.5 parts of L-lactide and 2.5 parts of triacetin (glyceryl triacetate). The vessel was evacuated and nitrogen was returned to a pressure of 1 atm. This operation was repeated for a total of four times to remove air. The L-lactide was melted under a pressure of 50 mm. The pressure was then returned to 1 atm. of nitrogen and the liquid was stirred with the flask in an oil bath at 105° C. The catalyst, approximately 0.08 part of a 25% solution of diethylzinc in heptane, was added by means of a hypodermic syringe. Polymerization set in rapidly. The flask was held at approximately 105° C. for 3 hours.

A sample of the poly-L-lactide/triacetin was dissolved in chloroform and the polymer was precipitated by adding the solution to methanol. After drying, the polymer was found to have an inherent viscosity of 1.66, as measured in a 0.1% solution in benzene. The unreprecipitated 95% poly-L-lactide/5% triacetin was molded at 190° C. to a rod ⅞" in diameter to fit a press spinner. The polymer was spun through a single 0.012" hole at approximately 185° C., and the filament was wound up at a rate of 600 yds./min. The product was plied to 30 filaments, and the triacetin was extracted by placing the package in water at 45° C. The extracted yarn was drawn 3.2× over a plate heated to 120° C. to give a product of 1 denier/filament having a tenacity of 3.43 g./d. at a break elongation of 18.8%.

For comparison purposes, 19 parts of finely divided poly-L-lactide of inherent viscosity 1.64 was covered with 1 part of triacetin dissolved in 17 parts of ethyl ether. This was mixed as thoroughly as possible and the ether was removed under vacuum. A 7/8" rod for the press spinner was molded at 190° C. The resulting product was spun through a single 0.012" hole at 185–190° C. The as-spun filament was brittle. Filament wound up at 600 yds./min. was too fragile to be backwound. Spinning at 190–195° C. did not improve the situation. A portion of the plasticized polymer that was wound up at 167 yds./min. could be backwound. It was extracted with water for 1 hour at 30° C. and then drawn 4× over a plate heated to 85° C. to give a filament of 3.5 dinier having a tenacity of 2.88 g./d. at a break elongation of 23%.

EXAMPLE II

Forty-five parts of L-lactide was polymerized in the presence of 5 parts of triacetin (10% by weight) following in detail the procedure described in Example I. After removing the plasticizer, the polymer was found to have an inherent viscosity of 1.45. The plasticized polymer was molded at 170° C. to a 7/8" rod for the press spinner. A single filament was spun through a 0.012" hole at a temperature of 177° C., quenched by passing through water, and wound up as 600 yds./min. The plasticizer was substantially removed in the quenching step. The filament was plied to a 30 filament yarn and was drawn 3.0× over a plate heated at 110° C. There was obtained a yarn of 1.4 denier/filament having a tenacity of 3.60 g./d. at a break elongation of 23.5%. The inherent viscosity of the yarn was 1.29, indicating that little thermal degradation had taken place.

EXAMPLE III

Forty parts of L-lactide was polymerized in the presence of 10 parts of triacetin (20% by weight) following in detail the procedure described in Example I. There was obtained a poly-L-lactide which, after removing the plasticizer, was found to have an inherent viscosity of 1.08. A 7/8" rod for the press spinner was molded at 145° C. This was spun at 162° C. through a single 0.012" hole, and the filament was wound up at a rate of 600 yds./min. after quenching in water. The yarn was further extracted with water to remove plasticizer and after drying was drawn 2.5× over a metal plate heated to 120° C. There was obtained a yarn of 2 denier/filament having a tenacity of 2.85 g./d. at a break elongation of 28.8%.

EXAMPLE IV

Forty parts of L-lactide was polymerized in the presence of 10 parts of diethyl phthalate following in detail the procedure of Example I. There was obtained a poly-L-lactide which, after removal of the diethyl phthalate, had an inherent viscosity of 2.40. The plasticized polymer was molded to a 7/8" rod, and this was spun in the press spinner through a single 0.012" hole at 175–180° C., and the filament was wound up at a rate of 600 yds./min. The resulting filament was plied, drawn 2.5× over a plate at 100° C., and the drawn yarn was extracted with hexane to remove diethyl phthalate. The resulting 3 denier/filament yarn had a tenacity of 4.52 g./d. at a break elongation of 17.3%.

For comparison purposes, 24 parts of a finely divided poly-L-lactide was covered with a solution of 6 parts of diethyl phthalate (20% by weight) dissolved in 7 parts of diethyl ether. This was mixed as thoroughly as possible and the ether was removed under vacuum. The poly-L-lactide/diethyl phthalate was molded to a 7/8" rod at 190° C. This was spun in the press spinner through a 0.012" hole at a temperature of 175–188° C. Below 182° C., the filament did not come out smoothly enough to spin. Above 182° C., the filament could be would up at 400 yds./min. and could be back-wound, but it appeared to have tiny lumps. The spun yarn was drawn 3.0× over a plate heated at 130° C. and was extracted with hexane to remove diethyl phthalate. This gave a 2.5 denier/filament product having a tenacity of 2.46 g./d. at a break elongation of 16.6%.

For further comparison, a sample of unplasticized poly-L-lactide of inherent vicosity 2.44 was molded to a rod for the press spinner. Attempts were made to spin this through a 0.012" hole at a temperature of 205–210° C. Under these conditions the filament extruded with a spiraling and twisting action. A smooth flow of the molten polymer could not be obtained.

TABLE I.—DATA ILLUSTRATING ADVANTAGE OF INVENTION

| Example | Non-polymerizable ester (percent) | Method [1] of addition | Poly-L-lactide $\eta_{inh}$ | Spin temp. (°C.) | Tenacity (g./d.)/elongation (percent)/denier |
|---|---|---|---|---|---|
| I | Triacetin (5) | A | 1.66 | 185 | 3.43/18.8/1 |
| I | do | B | 1.64 | 185–190 | 2.88/23.0/3.5 |
| II | Triacetin (10) | A | 1.49 | 177 | 3.60/23.5/1.4 |
| III | Triacetin (20) | A | 1.08 | 162 | 2.84/28.8/2 |
| IV | Diethyl Phthalate (20) | A | 2.40 | 175–180 | 4.52/17.3/3 |
| IV | do | B | 2.40 | 182–188 | 2.46/16.6/2.5 |
| IV | None | | 2.40 | 205–210 | ([2]) |
| V | Ethyl benzoate (20) | A | 2.40 | | |

[1] A—Plasticizer incorporated during polymerization; B—Plasticizer added to preformed polymer.
[2] Could not be spun well.

EXAMPLE V

Forty parts L-lactide was polymerized in the presence of 10 parts of ethyl benzoate (20% by weight) following in detail the procedure of Example I. There was obtained a poly-L-lactide which, when freed of ethyl benzoate by dissolving in chloroform and precipitating in petroleum ether, had an inherent viscosity of 2.40.

Data indicating the advantages of this invention are summarized in Table I which is comprehensive in that it contains all of the pertinent information from all of the examples. It will be noted that plasticized polymer prepared by adding the nonpolymerizable ester during polymerization gives products that (a) are spinnable at lower temperature and (b) give better yarn than is obtained with preformed polymer of the same molecular weight plasticized by adding the ester in a separate step.

The process of this invention affords a simple direct and economical method for preparing highly oriented, high tenacity, fine-denier filaments. The filaments have excellent dimensional stability in body tissue, and are useful in the preparation of braided sutures, surgical patch cloth, vascular grafts and the like.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process for preparing homopolymers or copolymers from inter- and intramolecular cyclic carboxylic esters by heating said esters above their melting point in the presence of a catalyst under anhydrous conditions in an inert atmosphere, the improvement which comprises carrying out the polymerization in the presence of from about 2 percent to about 50 percent by weight, based on said cyclic ester, of a nonpolymerizable ester having a boiling point above the melting point of the polymer produced; said nonpolymerizable ester being free of hydroxyl and carboxyl groups and being derived from an aliphatically saturated hydrocarbon carboxylic acid and an aliphatically saturated hydrocarbon alcohol that can contain ether oxygen linkages in the hydrocarbon moiety.

2. The process of claim 1 wherein said nonpolymerizable ester is derived from a carboxylic acid of the formula $Q(COOH)_m$ wherein Q is an aliphatically saturated hydrocarbon group of up to 18 carbon atoms and $m$ is a cardinal number of 1–3, and a hydroxyl compound of the formula $Q'(OH)_n$ wherein $Q'$ is of up to 18 carbon atoms and is an aliphatically saturated hydrocarbon group, a mono-oxahydrocarbon group, or a dioxahydrocarbon group, and $n$ is a cardinal number of 1–4, with the proviso that $m$ is 1 when $n$ is 2–4 and $n$ is 1 when $m$ is 2–3.

3. Process of claim 1 wherein said cyclic ester polymerizes to a polymer having recurring units of the structure

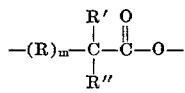

in which R is lower alkylene, $m$ is 0 or 1, $R'$ is hydrogen or lower alkyl, $R''$ is hydrogen or alkyl of up to about 22 carbon atoms when $m$ is 0, and $R''$ is hydrogen or lower alkyl when $m$ is 1.

4. Process of claim 3 wherein said cyclic ester is derived from an α-hydroxycarboxylic acid.

5. Process of claim 3 wherein said cyclic ester is lactide.

6. Process of claim 3 wherein said cyclic ester is a mixture of said ester containing at least 85 percent L-lactide by weight.

7. Process of claim 3 wherein said cyclic ester is L-lactide.

8. Process of claim 3 wherein said nonpolymerizable ester is triacetin.

9. Process of claim 1 wherein said polymeric composition so obtained is melt-spun at a temperature of from about 125° C. to about 255° C. and the filaments obtained are quenched with a liquid that dissolves the non-polymerizable ester but does not affect the polymer to substantially remove said non-polymerizable ester.

10. Process of claim 1 wherein said catalyst is an ester interchange catalyst.

References Cited

UNITED STATES PATENTS

| | | | |
|---|---|---|---|
| 2,306,071 | 12/1942 | McNally et al. | 260—78 |
| 2,703,316 | 3/1955 | Schneider | 260—78.3 |
| 2,758,987 | 8/1956 | Salzberg | 260—78.3 |
| 3,094,502 | 6/1963 | Farago | 260—30.8 |
| 3,304,279 | 2/1967 | Nielsen | 260—30.6 |

JOSEPH L. SCHOFER, Primary Examiner

J. C. HAIGHT, Assistant Examiner

U.S. Cl. X.R.

260—29.1, 31.2, 34.2